United States Patent

Planas

[15] 3,673,423

[45] June 27, 1972

[54] ELECTRONIC HIGH FREQUENCY PULSE GENERATOR

[72] Inventor: Luis Valls Planas, Barcelona, Spain

[73] Assignee: Neutra Cuatro S.A., Barcelona, Spain

[22] Filed: Oct. 19, 1970

[21] Appl. No.: 82,054

[30] Foreign Application Priority Data

Oct. 17, 1969 Spain ....................................373222

[52] U.S. Cl. ..............................307/107, 307/108, 315/207, 315/273, 315/353

[51] Int. Cl. ..........................................................H03k 3/00

[58] Field of Search ..............307/107, 108, 109, 110; 320/1; 328/26, 28, 31, 32, 136; 315/36, 207, 220, 244, 273, 353; 331/21, 20

[56] References Cited

UNITED STATES PATENTS

| | | | |
|---|---|---|---|
| 3,553,480 | 1/1971 | Lehmann et al. | 307/110 X |
| 3,127,570 | 3/1964 | Smenlers | 331/20 |
| 2,682,002 | 6/1954 | Gibson | 307/10 |
| 3,161,816 | 12/1964 | Holcomb | 328/21 X |
| 3,440,490 | 4/1969 | Parish | 315/273 |
| 3,496,412 | 2/1970 | Taylor | 315/244 |

*Primary Examiner*—Robert K. Schaefer
*Assistant Examiner*—William J. Smith
*Attorney*—Sughrue, Rothwell, Mion, Zinn & Macpeak

[57] ABSTRACT

An electronic high frequency pulse generator, connected to the A.C. feed mains, constituted essentially by a voltage limiter, a diode and a capacitor arranged in such a way that alternate half-cycles of the alternating feed current produce a high frequency pulse usable in a plurality of industrial processes.

4 Claims, 4 Drawing Figures

PATENTED JUN 27 1972 3,673,423

INVENTOR
LUIS VALLS PLANAS
BY Sughrue, Rothwell, Mion, Zinn & Macpeak
ATTORNEYS

ELECTRONIC HIGH FREQUENCY PULSE GENERATOR

The present invention relates to an electronic high frequency pulse generator, the pulse rate of which is synchronized with the cycle rate of the generator's alternating feed current.

In order to obtain pulses in a simple way which are suitable for diverse purposes, the present generator has been designed and comprises essentially three elements: a voltage limiter, a rectifier diode and a capacitor. The rectifier diode is in parallel with the voltage limiter so that one of their common terminals is associated with one of the feed intakes, whilst the other of their common terminals is connected in series with said capacitor, said capacitor having its other terminal associated with the other alternating feed current intake. With these three elements arranged as described, when the half-cycle in which the rectifier diode is conductive passes, this polarized current is stored by the capacitor which remains charged when the half-cycle finishes; on inversion of the polarity of the current in the following half-cycle, since said rectifier diode is non conductive, a polarized overvoltage is established across the terminals of the limiter which suddenly discharges this energy stored in the capacitor, thereby producing a high frequency pulse which is repeated every other half-cycle of alternation of the feed current.

Optionally, there may be a plurality of groups formed by the rectifier diode and the capacitor, fitted in series as voltage multipliers so that the polarized overvoltage obtained across the terminals of the voltage limiter is higher than that obtained with one sole group formed by the said rectifier diode and capacitor.

The pulse generator according to the invention may also have one or more induction coils at the feed connections so that, without cutting off the feed current, they may act as choke coils for the high frequencies generated by the device, preventing them from being absorbed through the feed line.

Also one or more capacitors may be included in the generator output so that by allowing the passage of the high frequencies generated by the device, they may act as decoupling capacitors for the feed circuit, allowing the high frequency circuit to be closed without shortcircuiting the feed circuit.

The generator may also have two rectifier diodes arranged in inverted relationship and associated with a feed intake at their point of connection, whilst the voltage limiter is arranged to form a bridge across the free ends of said diodes, two capacitors being arranged in series with the diodes and having their other ends associated to the other feed intake, whereby a high frequency pulse rate twice that obtained with the foregoing devices fitted with one or more rectifier diodes arranged as voltage boosters in one same direction is achieved.

Optionally there may be arranged a plurality of rectifier diodes in inverted relationship, provided with their relative capacitors to cause the overvoltage obtained across the terminals of the voltage limiter to be higher than that obtained with one pair alone of said rectifier diodes.

Other aims and features of the invention will be disclosed in detail in the following description, with reference to the attached illustrative drawings. In the drawings.

Figures 1, 2, 3, 4:
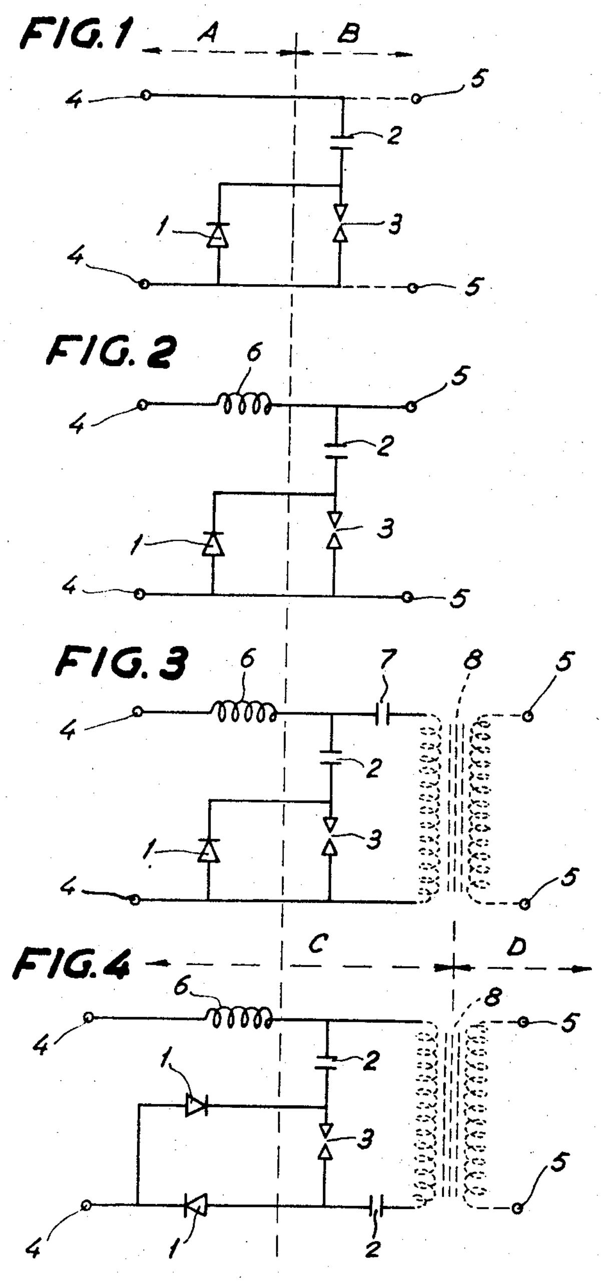
FIG. 1 is an electrical diagram of the present pulse generator in its simplest form.
FIG. 2 is a similar diagram to that of FIG. 1 to which a choke coil has been added.
FIG. 3 is a similar diagram to that of FIG. 2 to which a coupling capacitor has been added for the high frequency.
FIG. 4 is a further diagram of a generator according to the invention, in the simplest form showing a double rectifier diode in inverted relationship.

The present pulse generator operates as a booster rectifier of the alternating feed current. In the simplest embodiment, as shown in FIG. 1, it comprises a diode 1 in series with a capacitor 2 and a voltage limiter 3 in parallel with said diode 1. The apparatus is associated with a power source through the connections 4 and has outlet terminals 5 for the high frequencies.

The rectifier diode 1 is germanium, silicon or any other type; the capacitor 2 may be electrolytic since it works under a rectified pulsing current; the voltage limiter 3 is of the "spark gate" or static voltage discharge type.

This generator provides for a boost of the alternating feed current voltage so that as the current passes during one alternation half-cycle through the diode 1 in its conductive direction, it originates the charge of polarized current in the capacitor 2.

When the polarity of the current is inverted in the following half-cycle, the diode 1 ceases to be conductive, thereby creating a rectified overvoltage greater than the mains voltage which produces a ultra high speed discharge across the terminals of the limiter 3, generating a pulse which is of high frequency in view of its very short duration. In the case shown in FIG. 1, the pulse rate is equal to that of the current alternation cycles, bearing in mind that the discharge always takes place in one half-cycle of the alternating feed current.

FIG. 2 shows how it is feasible to add choke coils 6 in high frequency to the generator circuit described at the feed terminals 4. This prevents the high frequency pulses generated from being absorbed by the feed line itself.

FIG. 3 shows an embodiment allowing for the inclusion of coupling capacitors 7 for the high frequencies generated by the device which would prevent shortcircuiting of the feed circuit when the high frequency circuit closes.

FIG. 3 also shows in broken lines the radiofrequency transformer 8, with the inclusion of which this high frequency pulse generator gives a high tension output.

According to a further embodiment, the generator will be constituted according to the diagram of FIG. 4, so that it includes two diodes 1 mounted in inverse relationship, which diodes are associated with the power source 4 through their point of connection. The voltage limiter is placed as a bridge across the free ends of said diodes 1. In this case two capacitors 2 are arranged in series with the diodes 1 and are associated with the other terminal of the power source, through their point of connection. The radiofrequency transformer 8 may also be included in this embodiment with similar effects to those obtained with the embodiment shown in FIG. 3.

In this latter diagram, it is feasible to incorporate the choke coil 6 into the feed line to prevent the high frequency pulses being absorbed by the generator feed line.

This embodiment offers a pulse rate twice those obtained with the previous embodiments, since it provides pulse discharges on each of the alternation half-cycles of the feed current.

The present radiofrequency pulse generator apparatus produces such pulses of a very short duration, that is, of high speed, but spaced apart in such a way that the intervals between said pulses is determined by the changes in polarity of the current or alternating cycles of same due to the fact that it is the latter which causes the arc-over across the electrodes of the limiter 3 and it is this arc-over which, in turn, causes the high frequency pulses.

Said pulse generator is suitable for a diverse range of industrial or laboratory processes, since the high frequency pulse obtained with it, when properly applied, is suitable for broadcasting, for conversion to high tension, for being injected as a signal into another circuit, being dissipated in a gas medium creating effluvia, etc, for which reason, since the range of application possibilities of the electronic high frequency pulse generator is very extensive, we shall name some of them as illustrative but not limitative: radio signal generator, stroboscopic flash generator, control pulse generator, gas media ionizer, ozonizing atmosphere purifier, U.V. radiation sterilizer, electrostatic field generator, H.T. producer, voltaic arc-over exciter, gas lamp ignition exciter, high speed starter for fluorescent tubes, spark igniter for combustible gases, arc-over initiator in electric welding and other applications.

What I claim is:

1. An electronic high frequency pulse generator, having a pulse rate synchronized with the cycles of an alternating current source comprising voltage limiter means, rectifier diode means and capacitor means, said rectifier diode means being in parallel with said voltage limiter means such that one of their common terminals is connected to one of the terminals of said alternating current source and the other of their common terminals is connected in series with said capacitor means, said capacitor means having its other terminal connected to the other terminal of said alternating current source wherein during first half-cycles of the alternating current when the rectifier diode means is conductive, the current is stored by the capacitor means which remains charged after the said first half-cycles terminates and during a second half-cycles of said alternating current when said rectifier diode means is non-conductive, a polarized overvoltage is established across the terminals of said limiter means to fire said limiter means and thereby discharge the energy stored in said capacitor means, thereby producing high frequency pulses which are repeated every other half-cycle of alternating current.

2. An electronic high frequency pulse generator according to claim 1, which comprises one or more induction coil means at the terminals of said alternating current source such that said induction coil means acting as choke coils for the high frequencies generated by the pulse generator without interfering with the alternating current.

3. An electronic high frequency pulse generator, according to claim 1, wherein one or more capacitor means are included in the output of said generator for allowing the passage of the high frequencies generated by the generator, said capacitor means acting as decoupling capacitors for the alternating current source thereby allowing a high frequency pulse to be generated without shortcircuiting the alternating current source.

4. An electronic high frequency pulse generator having a pulse rate synchronized with the cycles of an alternating current source comprising a voltage limiter means, two rectifier diode means having a common terminal connected to a first terminal of said alternating current source, said rectifier diode means being coupled to said common terminal such that said diodes conduct in opposite directions, said voltage limiter means being connected across the terminals of said rectifier diode means which are not connected to said common terminal, said pulse generator further comprising a first capacitor means connected between one of said two rectifier diode means and a second terminal of said alternating current source and a second capacitor means connected between the other of said two rectifier diode means and a second terminal of said alternating current source, whereby said pulse generator produces a pulse for every half-cycle of said alternating current.

* * * * *